United States Patent [19]
Mizouchi et al.

[11] Patent Number: 5,790,902
[45] Date of Patent: Aug. 4, 1998

[54] ZOOM LENS

[75] Inventors: Satoru Mizouchi, Kanagawa-ken; Masatake Kato, Tokyo; Masaharu Eguchi, Kanagawa-ken; Hideki Ogawa, Tokyo, all of Japan

[73] Assignee: Canon Kabushiki Kaisha, Tokyo, Japan

[21] Appl. No.: 790,588

[22] Filed: Jan. 29, 1997

Related U.S. Application Data

[63] Continuation of Ser. No. 298,151, Aug. 30, 1994, abandoned.

[30] Foreign Application Priority Data

| Sep. 2, 1993 | [JP] | Japan | 5-243659 |
| Sep. 2, 1993 | [JP] | Japan | 5-243660 |
| Sep. 2, 1993 | [JP] | Japan | 5-243661 |

[51] Int. Cl.$^6$ .................................... G01J 1/20
[52] U.S. Cl. ................. 396/142; 396/71; 396/79; 396/91
[58] Field of Search ................. 396/71, 73, 79, 396/81, 82, 85, 89, 90, 91, 93, 142

[56] References Cited

U.S. PATENT DOCUMENTS

| 5,028,773 | 7/1991 | Hata | 354/195.1 |
| 5,066,968 | 11/1991 | Suzuki et al. | 354/400 |
| 5,077,569 | 12/1991 | Notagashira et al. | 354/195.12 |
| 5,079,575 | 1/1992 | Nii et al. | 354/195.11 |
| 5,122,826 | 6/1992 | Kodaka | 354/402 |
| 5,196,879 | 3/1993 | Hatu | 354/400 |
| 5,202,717 | 4/1993 | Ookubo et al. | 354/400 |
| 5,231,441 | 7/1993 | Hata | 354/400 |
| 5,278,605 | 1/1994 | Satoh | 354/446 |
| 5,281,796 | 1/1994 | Kaneda et al. | 354/402 X |
| 5,302,991 | 4/1994 | Nakayama | 354/195.12 |
| 5,352,882 | 10/1994 | Koyanagi et al. | 354/400 X |
| 5,369,461 | 11/1994 | Hirosawa et al. | 354/402 |
| 5,406,345 | 4/1995 | Hirasawa | 354/195.11 |

FOREIGN PATENT DOCUMENTS

| 52-114321 | 9/1977 | Japan. |
| 56-47533 | 11/1981 | Japan. |
| 64-33512 | 2/1989 | Japan. |
| 4184405 | 7/1992 | Japan. |

*Primary Examiner*—Daniel P. Malley
*Attorney, Agent, or Firm*—Fitzpatrick, Cella, Harper & Scinto

[57] ABSTRACT

A device includes a zoom lens having a focusing lens the position of which varies according to a zooming operation, a first moving part arranged to mechanically move the focusing lens according to the zooming operation, and a second moving part arranged to move the focusing lens in such a way as to electrically correct any shift of focus that results from the movement of the focusing lens caused by the first moving part.

4 Claims, 13 Drawing Sheets

ZOOM LENS

This application is a continuation of application Ser. No. 08/298,151 filed Aug. 30, 1994, now abandoned.

BACKGROUND OF THE INVENTION

1. Field of the Invention

This invention relates to a rear focus type zoom lens and more particularly to a compact, rear focus type zoom lens which is of a high magnifying power, has its minimum object distance (closest focusing distance) at a short distance and is provided with a focus correcting mechanism arranged to be capable of adequately correcting the shift of focus in zooming over the whole area of zooming from an infinite object distance to a nearest object distance and to be suited for a 35 mm single-lens reflex camera, a video camera, an electronic still camera or the like.

2. Description of the Related Art

In the case of a zoom lens of the type arranged to perform focusing by moving a front lens group or a part of the front lens group along an optical axis, the amount of drawing out the focusing lens for adjusting focus to a certain object distance is almost constant irrespective of the focal length of the zoom lens. It has been, therefore, not necessary to use any complex moving mechanism for focusing.

However, if the minimum object distance is set to be short, the diameter of the front lens becomes larger in order to obtain a desired ratio of brightness of the edge of the image field, particularly in a case where the zoom lens is arranged to include such a wide angle of view that causes the focal length to become shorter than the diagonal line of an image plane on the side of a short focal length (wide-angle side). The increased size of the lens has presented some problem. For example, a load on focusing-lens driving means included in the automatic focusing type cameras popularly in use these days is increased by the larger size of lens to prevent a speedy automatic focusing action.

In view of these problems, rear-focus type zoom lenses have been contrived in various manners to carry out focusing by using a rear lens group or a part of the rear lens group which is disposed in rear of the front lens.

Compared with the zoom lens arranged to perform focusing by moving the front lens, the first lens group of the rear-focus type zoom lens can be arranged to have a smaller effective diameter, so that the whole lens system can be arranged in a smaller size. In addition to this advantage, a close-up shot or an ultra-close-up shot can be taken without difficulty. It is another advantage of the rear-focus type zoom lens that, since a focusing action is performed by moving a lens group having a relatively light weight, the focusing action requires a relatively small driving force and thus can be promptly carried out.

However, a problem with the rear-focus type zoom lens lies in that the amount of drawing out the focusing lens for focus adjustment to a certain object distance varies with the focal length. Therefore, in order to carry out zooming while keeping the lens in an in-focus state, it is necessary to use a focus correcting mechanism which is arranged to correct the position of the focusing lens in association with the zooming action. Therefore, to meet this requirement, various correcting methods have been contrived for rear-focus type zoom lenses. The typical correcting methods heretofore employed include, for example, the following methods: (i) correction by automatic focusing, (ii) correction by an electronic cam and (iii) correction by a mechanical cam.

The method (i) has been disclosed, for example, in Japanese Patent Publication No. SHO 56-47533. The method (ii) has been disclosed, for example, in Japanese Patent Application Laid-Open No. SHO 52-114321. The method (iii) has been disclosed, for example, in Japanese Patent Applications Laid-Open No. HEI 4-184405 and Laid-Open No. SHO 64-33512, etc.

In the case of the method (i) of correcting the focusing lens position by automatic focusing (Japanese Patent Publication No. SHO 56-47533), a focal plane which has been varied by a change taking place in focal length is corrected by driving the focusing lens, on the basis of information obtained from focus detecting means provided for automatic focusing, in such a way as to keep the focusing lens in a predetermined position.

In the method (ii) of correcting by means of an electronic cam (Japanese Patent Application Laid-Open No. SHO 52-114321), a positional relation obtained in zooming an optical axis between the position of a variator lens (an optical sliding element) and that of a focusing lens (another optical sliding element) is stored in a storage means in the form of a matrix of object distances in relation to the positions of the variator lens. While a zooming action is in process after focusing, the focusing lens is driven according to data read out from the storage means in such a way as to correct any shift of focus.

The method (iii) of correcting the focusing lens position by a mechanical cam (Japanese Patent Application Laid-Open No. HEI 4-184405) is used also for embodiments of this invention as will be described later herein. In accordance with this method, a focusing-and-zooming cam ring is arranged to have a focusing-and-zooming cam which is a representative curve proximately formed by overlapping the focusing drawing-out curves which are loci of focusing movement of the focusing lens made at every one of focal lengths for all object distances for focusing on an infinite object distance to a nearest object distance, with their origins shifted from each other in such a way as to minimize any focus error. The focusing-and-zooming cam ring is used in such a manner that the area of the focusing-and-zooming cam to be used is shifted by zooming (a zooming action) and, at the same time, any shift of focus is corrected by moving the focusing-and-zooming cam ring itself in the direction of an optical axis.

In the case of another example of the method (iii) of correcting the focusing lens position by a mechanical cam, disclosed in Japanese Patent Application Laid-Open No. SHO 64-33512, a three-dimensional cam is arranged in such a manner that its movement in the direction of circumference represents the movement of the focusing lens caused by focusing while its movement in the direction of diameter represents the movement of the focusing lens caused by a zooming action. A pin is arranged to be caused by a zooming action to move on the cam face of the three-dimensional cam in the diametral direction. The shift of focus is corrected according to the position of the focusing lens on the optical axis corresponding to any zoom position obtained with the cam face of the three-dimensional cam traced by the pin.

The conventional method (i) of correcting the focusing lens position by automatic focusing, has a merit in that the mechanical arrangement of the zoom lens can be simplified. However, since the focus correction greatly depends on the capability of focus detecting means, in the event of any object that is hard to adequately deal with for the focus detecting means, the focus correction is not adequately accomplished or the focus detecting action tends to delay to hinder adequately shooting. Another demerit of this method lies in that, since the method necessitates to constantly drive an actuator (a motor in general), a burden imposed on a power supply increases.

The correcting method (ii) using the electronic cam has a merit in that, unlike the correcting method (i) automatic focusing, the focus correction does not depend on the capability of the focus detecting means. However, the problem that the focusing lens is constantly driven still remains unsolved also in this case. Further, since the amount of shift of focus resulting from the driving error of the focus driving means is large, precise and elaborate control must be carried out by the focus driving means. A further problems of this method lies in that the method necessitates use of storage means of a relatively large storage capacity.

In the former example of the correcting method (iii) of using the mechanical cam, unlike the methods (i) and (ii), no focus driving means is used while the zoom lens is in process of zooming. Therefore, no electric energy is consumed for focus correction and the method is completely compatible with a manual zooming operation. It is another merit of this method that a focusing-lens-position correcting system can be completely arranged within the lens barrel and requires no additional system arrangement on the side of the camera body.

However, in the event of a power arrangement wherein a focusing drawing-out curve severely bends, it might become impossible to adequately carry out the correction in proximity to the focusing-and-zooming cam. Therefore, the focus has sometimes greatly shifted depending on the object distance.

In the case of the latter example of the method (iii), it has the same merits as those of the former example. However, in order to obtain a correct lens position, the latter example necessitates use of a pin which is sufficiently small in comparison with the size of the three-dimensional cam. Further, since the three-dimensional cam cannot be arranged in a cylindrical shape covering the outside of the optical system, it hinders any effort contemplated to make the lens barrel more compact.

SUMMARY OF THE INVENTION

It is an object of this invention to provide a compact rear-focus type zoom lens which is of the kind having a high magnifying power and a short minimum object distance and can be relatively simply arranged as a system to have a focus correcting mechanism adequately arranged to correct the shift of focus during the process of zooming, so that the problems presented by the conventional zoom lens can be solved.

It is another object of this invention to provide a zoom lens device which is an improvement over a rear focus type zoom lens disclosed in Japanese Patent Application Laid-Open No. HEI 4-184405 as mentioned in the foregoing. According to this invention, the rear focus type zoom lens is improved in that almost no change takes place in the state of focus even in the event of a manual zooming operation.

To attain these objects, a zoom lens device arranged according to this invention as a preferred embodiment thereof includes a zoom lens having a focusing lens the position of which varies according to a zooming operation, first means for mechanically moving the focusing lens according to the zooming operation, and second means for moving the focusing lens so as to electrically correct any shift of focus caused by the focusing lens moved by the first means, in such a way as to eliminate any shift of focus that takes place when a manual zooming operation is mechanically carried out.

These and further objects and features of this invention will become apparent from the following detailed description of embodiments thereof taken in connection with the accompanying drawings.

DETAILED DESCRIPTION OF THE PREFERRED EMBODIMENTS

Figure 1:
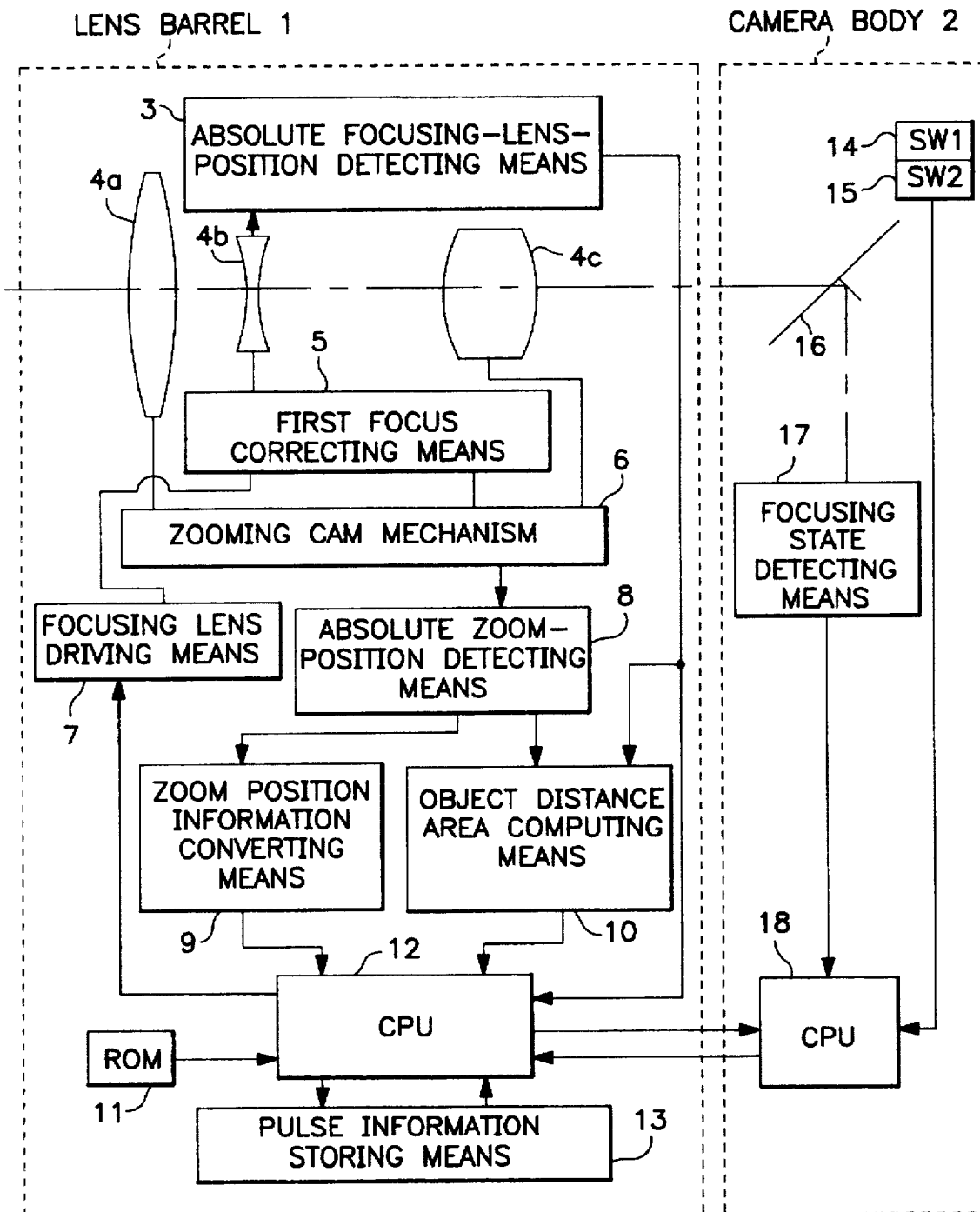
FIG. 1 is a block diagram showing the essential parts of a system arrangement of a first embodiment of this invention.

FIG. 1 is a block diagram showing the essential parts of a system arrangement of a first embodiment of this invention. Referring to FIG. 1, a lens barrel 1 is arranged to be detachably mountable on a camera body 2. Means 3 for detecting the absolute position of a focusing lens 4b is arranged to detect the position of the focusing lens 4b on an optical axis and to send out position information thus obtained to object distance area computing means 10 and a CPU 12. Variator lenses 4a and 4c (a variator lens unit) respectively relate to a power varying action. The focusing lens 4b (a focusing lens unit) is arranged to correct changes taking place on the image plane, as a result of the power varying action, as well as to perform a focusing action. A zoom lens is composed of these lenses 4a, 4b and 4c.

First focus correcting means 5 is arranged to act at least within a predetermined object distance range (a first range of object distances) and to mechanically keep an in-focus state in association with zooming when the zooming action is performed after the in-focus state is obtained at least for any object that is located within the predetermined object distance range. The first focus correcting means 5 will be described in detail later.

There are further provided a zooming cam mechanism 6 and focusing lens driving means 7 which is arranged to drive the focusing lens 4b according to a signal from the CPU 12. Absolute zoom-position detecting means 8 detects the positions of the lenses 4a and 4c on the optical axis and sends out position information thus obtained to zoom position information converting means 9 and object distance area computing means 10.

The zoom position information converting means 9 is arranged to convert the zoom position information sent from the absolute zoom-position detecting means 8 and to send conversion data thus obtained to the CPU 12.

The object distance area computing means 10 is arranged to compute and obtain an object distance area corresponding to the object of shooting, by using the position signals obtained respectively from the absolute focusing-lens-position detecting means 3 and the absolute zoom-position detecting means 8. The result of computation (data) is sent to the CPU 12.

A ROM (memory element) 11 is arranged as a storage means to store information relative to amounts of correction for amounts of defocus. In the case of this embodiment, the amounts of correction for amounts of defocus are computed according to a function of zoom position which varies with a respective one of the object distance ranges as previously set. Information on the amounts of correction for amounts of defocus is stored in the ROM 11 as coefficients to be used in computing the function of zoom position. The CPU 12 is disposed within the lens barrel 1. Pulse information storing means 13 is arranged to store information on the pulses of the focusing lens driving means 7.

The camera body 2 has switches 14 (SW1) and 15 (SW2), which are used for sending out instruction signals to a CPU 18. The camera body 2 further includes a mirror 16. Focusing state detecting means 17 is arranged to detect the state of focus of the lens barrel 1. The CPU 18 is arranged within the camera body 2 to compute and control the amount of movement of the focusing lens 4b on the optical axis by using a signal obtained from the focusing state detecting means 17.

A second focus correcting means is composed of the absolute focusing-lens-position detecting means 3, the absolute zoom-position detecting means 8, the storage means 11 and the focusing lens driving means 7 (a stepping motor which is arranged to be used only for focusing).

Figure 2:
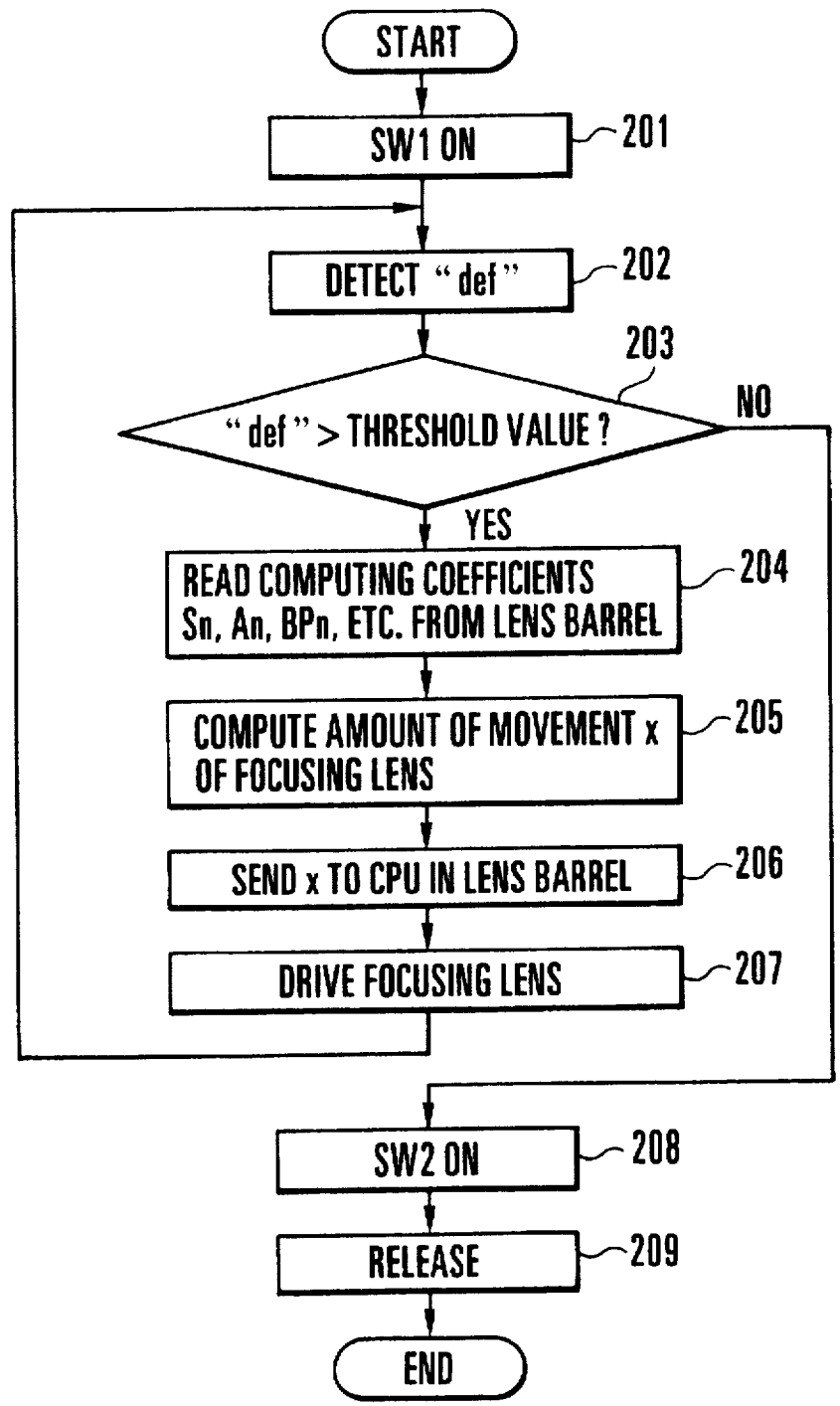
FIG. 2 is a flow chart showing a focusing action of the first embodiment of this invention.

This embodiment performs a focusing operation as described with reference to a flow chart shown in FIG. 2 as follows: An object image coming through the zoom lens within the lens barrel 1 is sent to a photo-electric conversion element of the focusing state detecting means 17 which is disposed in the camera body 2.

At a step 201, when the switch SW1 is turned on by the first stroke of a release button, the flow of operation proceeds to a step 202. At the step 202, the amount of defocus "def" is detected by the focusing state detecting means 17. At a step 203, the amount of defocus "def" is compared with a predetermined threshold value. If the amount of defocus "def" is found to be larger than the threshold value, the folow comes to a step 204. At the step 204, the CPU 18 reads, from the lens barrel 1, computing coefficients Sn, An, BPn, etc., for computing an amount of movement of the focusing lens 4b which is determined by the zoom position of the zoom lens, the position of the focusing lens 4b, etc.

At a step 205, the amount of movement "x" of the focusing lens 4b on the optical axis is computed by using the computing coefficients Sn, An and BPn and the amount of defocus "def". At a step 206, the result of computation is sent out to the CPU 12 which is disposed in the lens barrel 1. At a step 207, the CPU 12 sends a control instruction to the focusing lens driving means 7 to move the focusing lens 4b on the optical axis by the amount of movement "x". After the above-stated actions, the flow of operation comes back to the step 202, where the amount of defocus "def" is again detected by the focusing state detecting means 17. The above-stated actions of the steps 202 to 207 are repeated until the amount of defocus "def" is found to have become smaller than the threshold value at the step 203.

When the amount of defocus "def" is found to have become smaller than the threshold value at the step 203, the CPU 18 decides that an in-focus state is obtained, and the flow comes to a step 208. At the step 208, the flow waits until an instruction for a release is given by the operator with the switch SW2 turned on by the second stroke of the release button. With the switch SW2 turned on, the flow comes to a step 209 to terminate the focusing operation.

In some cases, depending on the kind of the camera, priority is given to a release if the switch SW2 is turned on by the second stroke of the release button even when the zoom lens is still not in focus.

Figure 3:
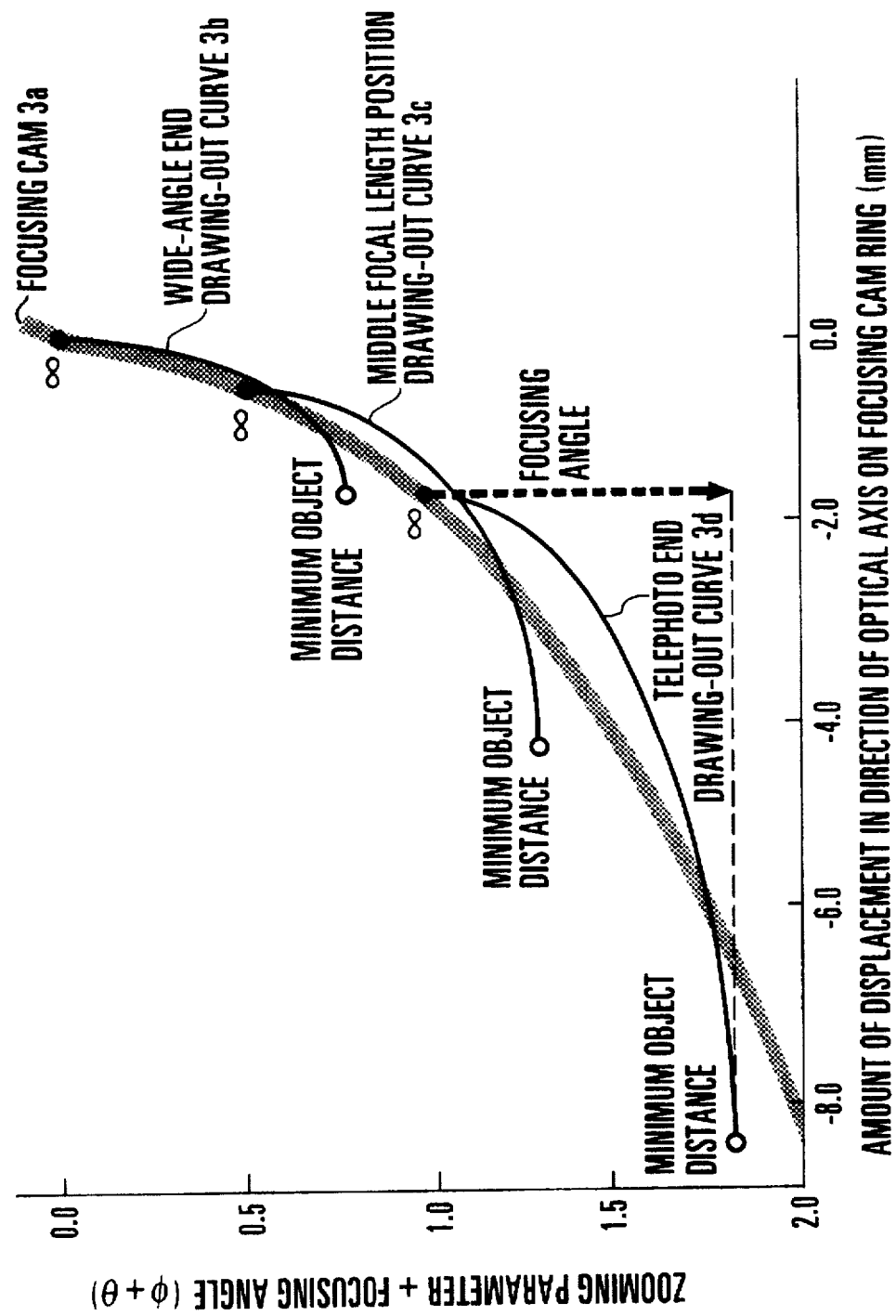
FIG. 3 shows the shape of a focusing-and-zooming cam.
Figure 5:
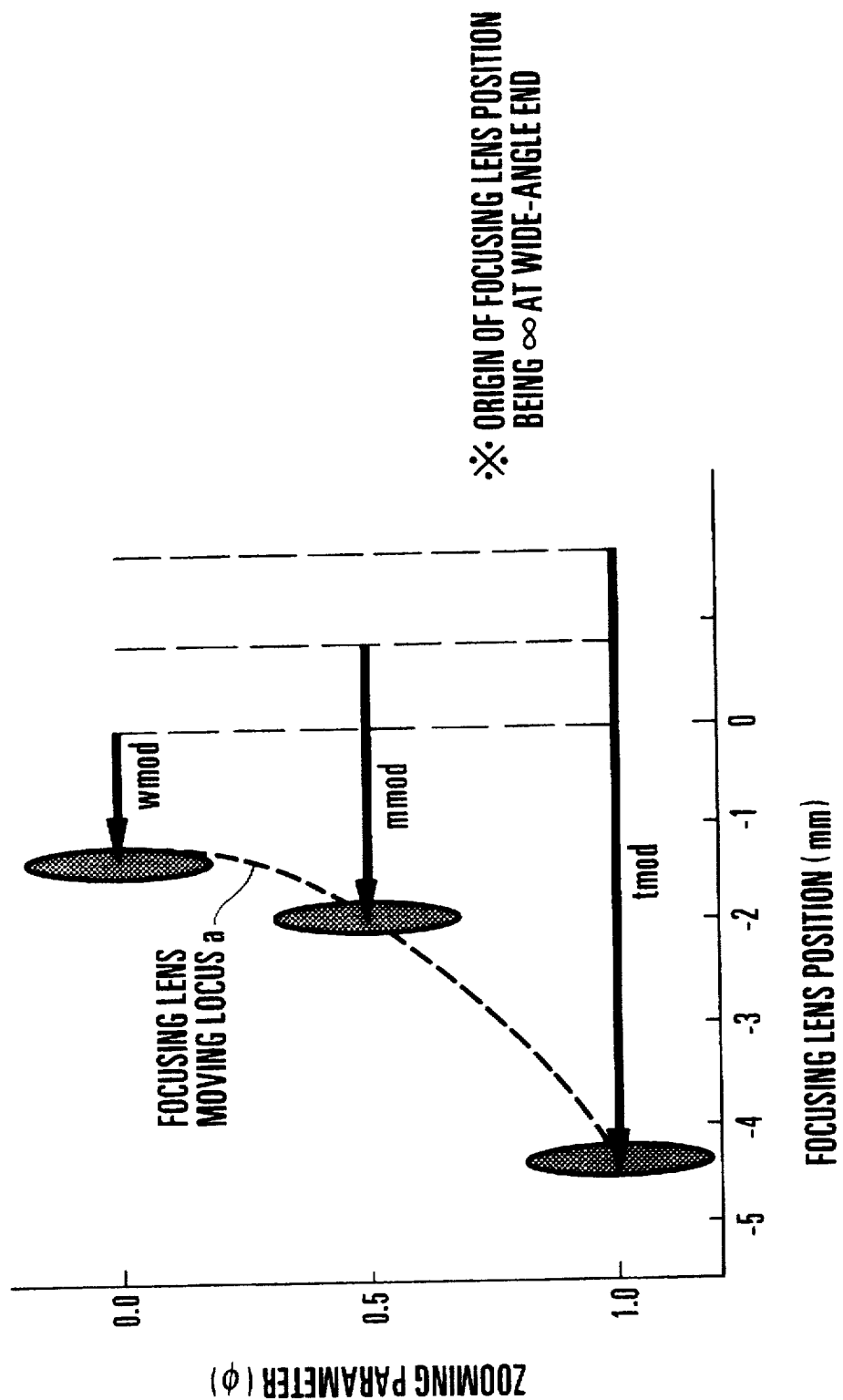
FIG. 5 shows the locus of moving a focusing lens in zooming for an object located at the nearest distance.

The first focus correcting means 5 in this (first) embodiment is described as follows: FIG. 3 shows the shape of a focusing-and-zooming cam arranged to be used for the first focus correcting means 5. In FIG. 3, the axis of ordinate shows the sum of a focusing angle and a zooming parameter (hereinafter referred to as ZP) which is provided for facilitating design work. The zooming parameter corresponds to the rotation angle of a manual zoom ring and is generally set, with a reference focal length state assumed to be "0", at a value which is in proportion to the angle of rotation of a zoom cam ring from the reference focal length state. In the case of FIG. 5 which will be described later, the zooming parameter is at "0" at the wide-angle end position and "1" at the telephoto end position of the zoom lens.

The focusing angle corresponds to the rotation angle of the manual focusing ring. While the origin of the focusing angle is determined by an infinitely distant object, a maximum value of the focusing angle is determined by the shape of the focusing-and-zooming cam. The focusing angle will be described in detail later.

The axis of abscissa of FIG. 3 shows the amount of displacement taking place on a focusing cam ring in the direction of the optical axis. In the case of this embodiment, a focusing lens position where an in-focus state is obtained for an infinitely distant object at the wide-angle end is assumed to be an origin.

In FIG. 3, a curve 3a represents the focusing-and-zooming cam. The curve 3a is a representative curve proximately obtained for all the focal lengths and object distances by overlapping focusing drawing-out curves 3b, 3c and 3d obtained for different focal lengths in such a way as to have a minimum focusing error (within the allowable range of the depth of field).

For example, the curve 3b shows the focusing drawing-out amounts obtained in carrying out focusing from an infinite object distance toward a minimum object distance with the zoom lens at its wide-angle end.

Figure 4:
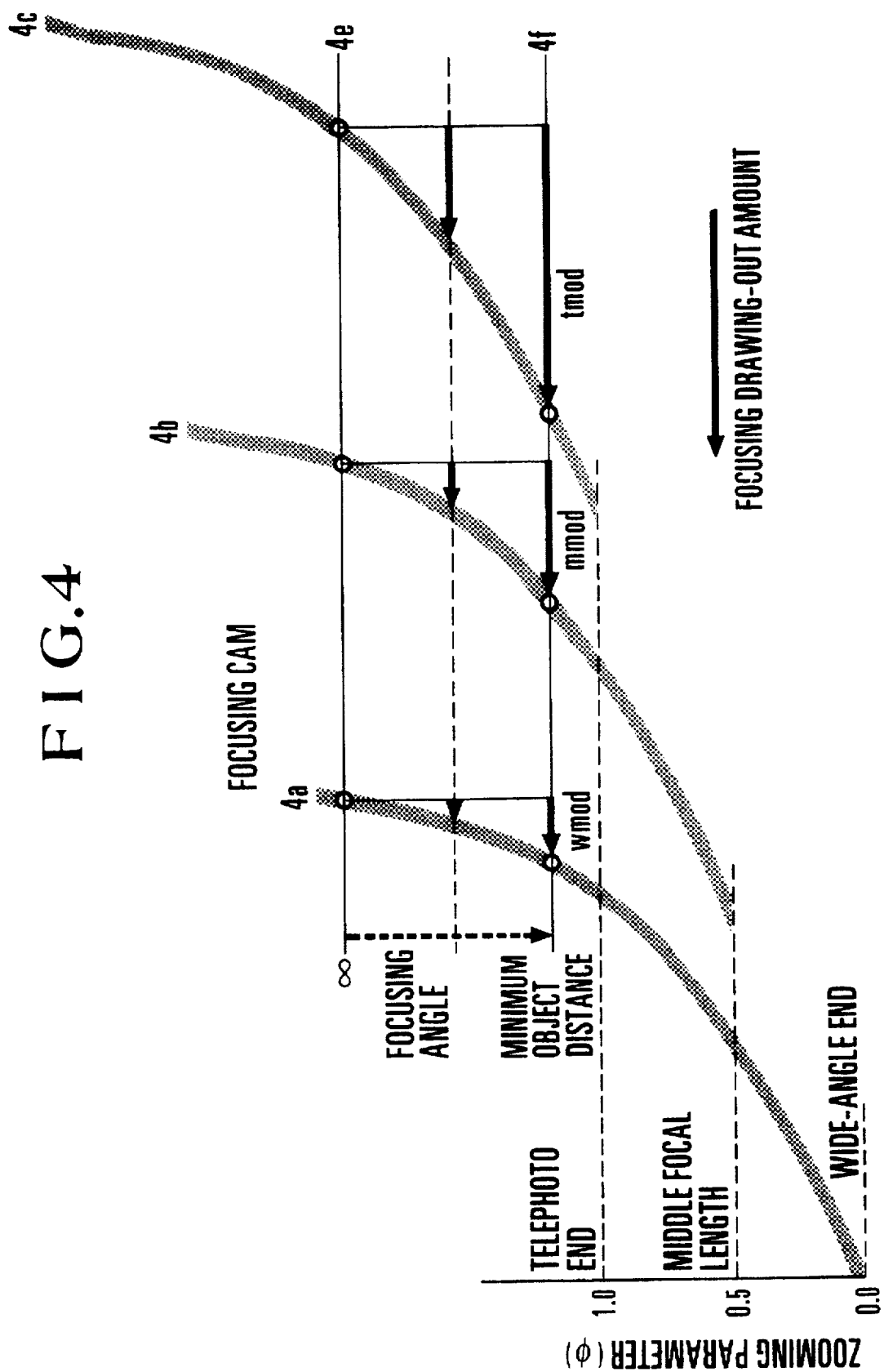
FIG. 4 shows the principle of obtaining a drawing-out amount by using the focusing-and-zooming cam.

FIG. 4 shows actions performed for obtaining an amount to which the focusing lens is to be drawn out in obtaining an in-focus state for a desired object distance at a desired focal length by using the focusing-and-zooming cam. The focusing-and-zooming cam is arranged to effect movement in the direction of the axis of ordinate indicating the zooming parameter when a zooming action is performed. In the case of FIG. 4, the rotation of the focusing-and-zooming cam ring which is interlocked with the rotation of the zoom cam ring is shown in a state of being developed on a plane.

Further, as will be described later, the focusing-and-zooming cam ring itself is moved in the direction of the optical axis by the zooming action. However, this movement is not shown in FIG. 4. Therefore, only the focusing drawing-out amounts are shown in FIG. 4, and the position on the optical axis of the focusing lens is not shown in FIG. 4.

In the case of this embodiment, the area of the focusing-and-zooming cam to be used for focusing at each focal length is represented in FIG. 4 by an area which is sandwiched in between straight lines 4e and 4f. The area is shifted according to a zooming action as shown in FIG. 4. More specifically, the cam area is located in an upper end part of the focusing-and-zooming cam when the zoom lens is in its wide-angle end position. The cam area moves downward accordingly as the zoom lens position comes nearer to its telephoto end position and reaches the lower end part of the cam when the zoom lens comes to its telephoto end. Then, a desired amount of drawing out the focusing lens is obtained by allowing the focusing-and-zooming cam to rotate within applicable one of the cam areas by rotating a cam follower which is interlocked with the focusing lens.

With the applicable shape of the focusing-and-zooming cam specified as mentioned above, even if a zooming action is performed with the focusing angle (rotation angle) fixed to a value corresponding to a certain focal length and to a certain object distance, a focusing drawing-out amount which corresponds to a focal length obtained after zooming can be approximately obtained.

Further, in FIG. 4, reference symbols "wmod", "mmod" and "tmod" respectively denote focusing drawing-out amounts to be obtained for the minimum object distance with the zoom lens in its wide-angle-end, middle and telephoto-end positions.

Further, FIG. 4 shows that the focusing action can be carried out at one and the same focusing angle for objects located at different distances from the infinite object distance to the minimum object distance irrespective of the zoom position.

A power arrangement of a lens system by which both the locus of movement of a focusing lens caused by a zooming action and the locus of movement of the focusing lens caused by a focusing action can be expressed approximately in one curve has been known. However, such power arrangement is not desirable, because the latitude allowed to the power arrangement is limited. In the case of this embodiment, therefore, the focusing-and-zooming cam ring itself is arranged to be movable in the direction of the optical axis in association with a zooming action. This arrangement allows the rotating amount and the rotating direction of the focusing angle to be freely set.

FIG. 5 shows by way of example a locus of the zooming movement of the focusing lens for the minimum object distance. The position of the focusing lens (on the optical axis) varies as represented by a curve "a" according to the sum of the amount of movement of the focusing-and-zooming cam ring in the direction of the optical axis and the focusing drawing-out amount, as shown in FIG. 5.

The focusing angle mentioned in the foregoing is described as follows: As mentioned in the foregoing, the focusing drawing-out amount, i.e., the amount of drawing out the focusing lens for focusing, is obtained with the cam follower which is connected directly to the focusing lens and inscribed to the focusing-and-zooming cam caused to rotate along the cam by a focusing rotation member. The term "focusing angle" as used in the foregoing means the angle of rotation made by this focusing rotation member for focusing. With the focusing angle arranged in the manner as mentioned above, in bringing the zoom lens into focus on one and the same object, any change of focus that is caused by a change in focal length is suppressible to a small amount.

Figure 6:
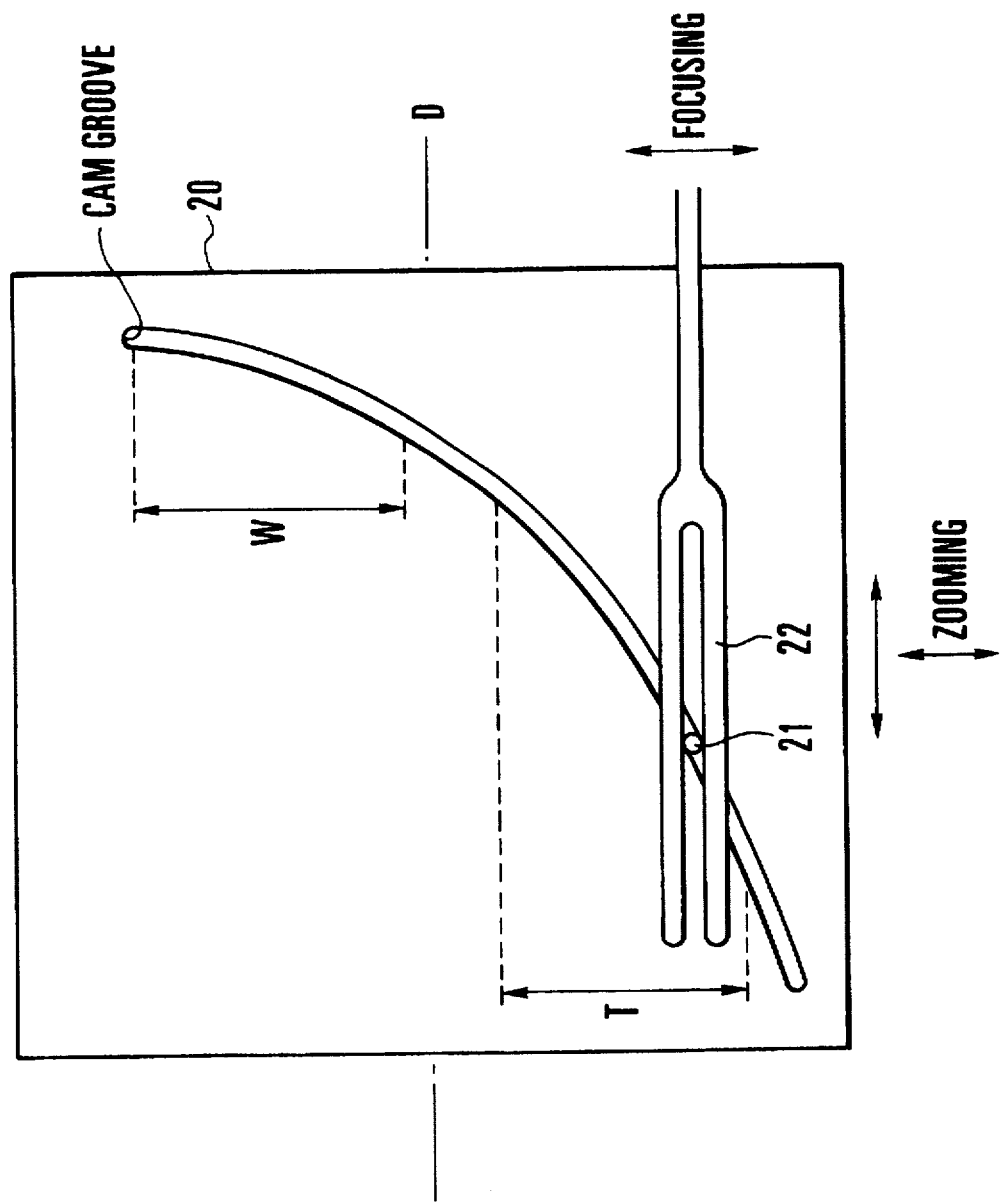
FIG. 6 shows an arrangement made for lens movement according to this invention.

FIG. 6 shows a moving mechanism arranged to move the focusing lens on the basis of the principle mentioned in the foregoing. In FIG. 6, reference numeral 20 denotes a cam tube in which the focusing-and-zooming cam is formed. The cam tube 20 is arranged to rotate according to a zooming operation and to be moved back or forth along the the optical axis "o" of the zoom lens. A cam follower 21 is connected directly to the focusing lens and engages a member 22 which is formed in a fork-like shape and is arranged to be caused by a focusing operation to rotate a predetermined extent of angle along the circumferential surface of the cam tube 20. In zooming, the cam tube 20 is rotated and also moved back or forth, while the member 22 remains stationary. Therefore, the focusing lens comes to move back or forth along the optical axis. In focusing, on the other hand, the member 22 moves in the direction of arrow (rotating direction) to cause the focusing lens to move along the focusing cam.

Further, in FIG. 6, reference symbol T denotes a range of rotating angle of the member 22 within which the member 22 is allowed to rotate for focusing when the zoom lens is at the telephoto end. Reference symbol W denotes a range of rotating angle of the member 22 within which the member 22 is allowed to rotate when the zoom lens is at the wide-angle end.

The member 22 is connected to a stepping motor which is arranged to receive, in focusing, the output of the focusing state detecting means 17 shown in FIG. 1. The member 22 is thus arranged to be driven by the stepping motor in the rotating direction according to the number of pulses applied to the stepping motor.

In the event of manual zooming, the cam tube 20 rotates and also moves back or forth to effect zooming. If a focusing position becomes not allowable by this mechanism as a result of zooming, the member 22 is caused to rotate in the direction of rotation by the stepping motor in such a way as to move the focusing lens.

Figure 7:
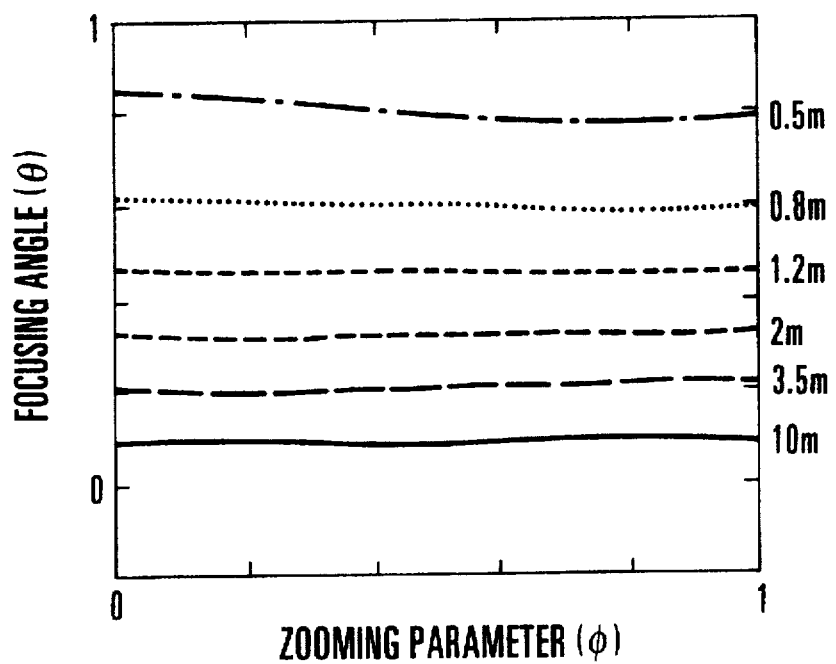
FIG. 7 shows changes of focusing angle caused by zooming with first focus correcting means used for a zoom lens having a zoom ratio of about four magnifications.

FIG. 7 shows the changes of the focusing angle caused by a zooming action in a case where the focusing-and-zooming cam is designed in such a shape as deemed to be most apposite to a zoom lens having a zoom ratio of four magnifications or thereabout.

Referring to FIG. 7, in zooming from the telephoto end toward the wide-angle end, for example, even if the focusing angle is fixed to an angle obtained at the telephoto end, the focusing angle thus obtained differs only slightly from focusing angles for other focal lengths to be obtained while zooming is in process. The amount of change (shift) of focus caused by zooming is small and can be confined within the depth of field at any object point within an object distance range, except a part of it on the side of the minimum object distance.

In other words, an in-focus state is retainable at all focal lengths without performing any focusing driving action again after the in-focus state is once attained by a focusing action at the telephoto end.

Figure 8:
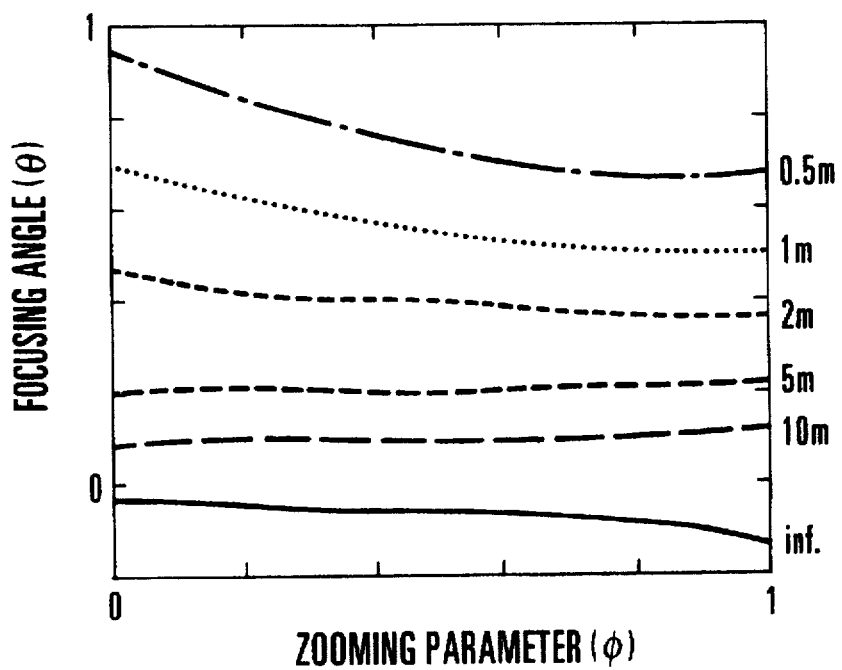
FIG. 8 shows changes of focusing angle caused by zooming with the first focus correcting means used for a zoom lens having a zoom ratio of seven magnifications or thereabout.

FIG. 8 shows the changes of the focusing angle caused by a zooming action in a case where the focusing-and-zooming cam is designed in such a shape as deemed to be most apposite to a zoom lens arranged to have a higher zoom ratio of seven magnifications or thereabout.

Referring to FIG. 8, in this instance, with a focusing angle decided at the telephoto end for object points located within a range of object distances from an infinite object distance to an object distance of about 2.2 m (a first object distance range), the shift of focus caused by zooming after this focusing angle is decided for these object points does not exceed plus or minus 0.3 mm, which is within an allowable range. In other words, the amount of shift of focus can be corrected by the mechanical focus correcting means described above. The shift of focus, however, comes outside of the allowable range and no longer can be corrected by the same focusing angle for object distances from 2.2 m to 0.5 m (a second object distance range). Therefore, this embodiment is arranged to correct the amount of shift of focus by causing the member 22 to rotate even while a zooming operation is in process.

Figure 9:
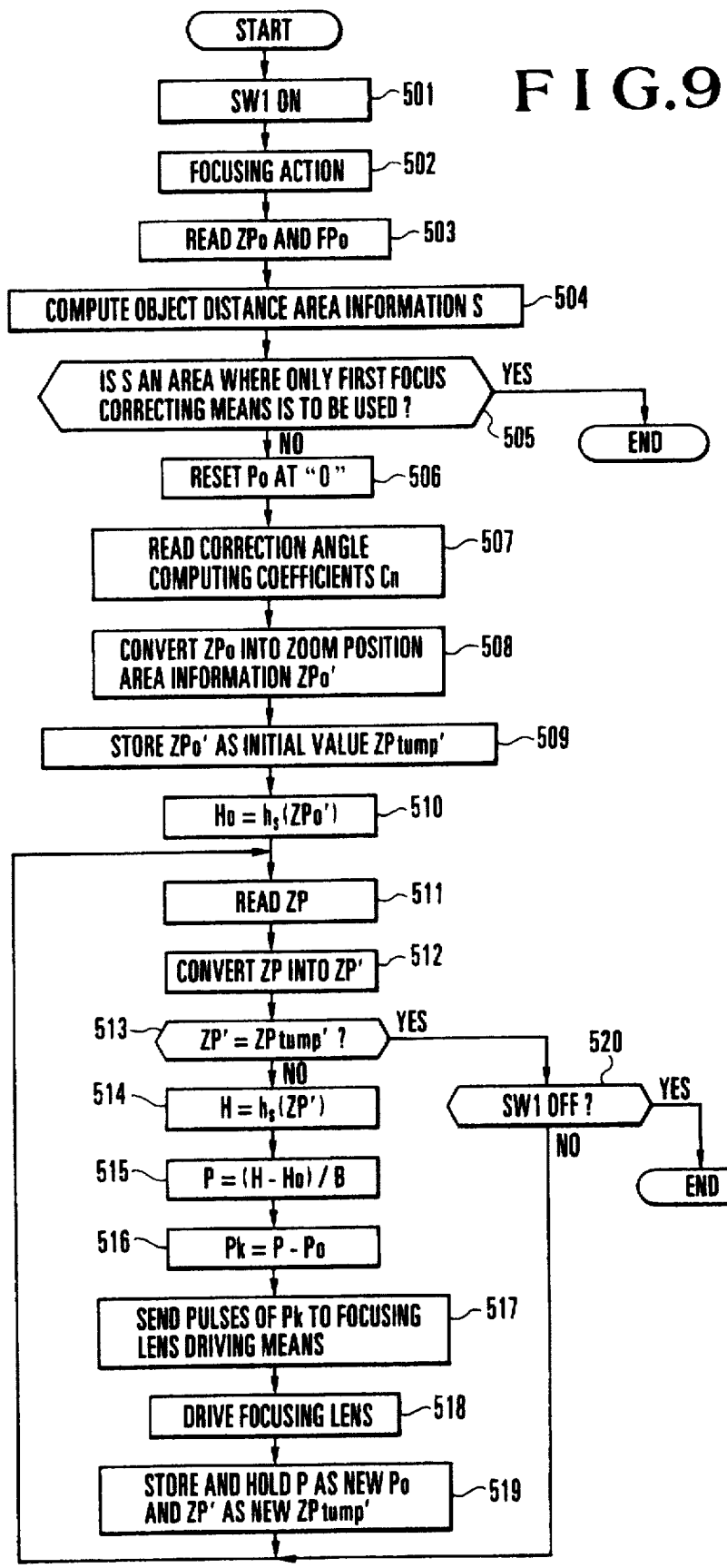
FIG. 9 is a flow chart showing focus correcting actions of the first embodiment.

Next, the whole focus correcting operation of this embodiment is described below with reference to FIG. 9 which is a flow chart: At a step 501, when the switch SW1 is turned on by a first stroke of the release button, the flow comes to a step 502. At the step 502, a focusing operation is executed on the basis of the flow chart shown in FIG. 2. At a step 503, the object distance area computing means 10 disposed within the lens barrel 1 reads information on a focusing lens position FPo from the absolute focusing-lens-position detecting means 3 and also information on a zoom position ZPo from the absolute zoom-position detecting means 8. The information on the absolute focusing-lens-position FPo and the zoom position ZPo is direct position information like the above-stated focusing angle, the rotation angle of the focusing rotation member 22 or the position of the focusing lens 4b in the direction of the optical axis.

A shooting distance range from an infinite object distance to a minimum object distance is divided beforehand into a plurality of object distance areas. At a step 504, the object distance area computing means 10 compute object distance area information S corresponding to the object by using the focusing lens position information FPo and the zoom position information ZPo. The result of computation (data) thus obtained is sent out to the CPU 12.

Next, at a step 505, a check is made to find whether the object distance area information S indicates an area for which the focus is to be corrected solely by the first focus correcting means mentioned in the foregoing or an area for which the focus is to be corrected by a second focus correcting means (to be described later). If the object distance area information S is found to indicate the area for which the first focus correcting means is to be solely used, the CPU 12 brings its process to an end. If not, the flow comes to a step 506 to have the CPU 12 proceed with the action of the second focus correcting means to be performed at the step 506 and steps subsequent to the step 506.

At the step 506, the value of control pulses Po at the pulse information storing means 13 is reset at "0". The pulses Po contribute to a driving action on the focusing lens. At a step 507, the CPU 12 reads out from the ROM 11 a plurality of correction angle computing coefficients Cn which correspond to the object distance area information S. With a focusing angle for each object distance area at a predetermined zoom position assumed to be a reference value, the term "correction angle" means a focusing angle for some other zoom position and expressed as an amount of change from the reference value.

At a step 508, the zoom position information converting means 9 converts the actual zoom position information ZPo into a representative value ZPo' (see FIG. 10) representing an applicable zooming area of a plurality of zooming areas as divided beforehand. The representative value (data) obtained as a result of conversion is sent out to the CPU 12.

Figure 10:
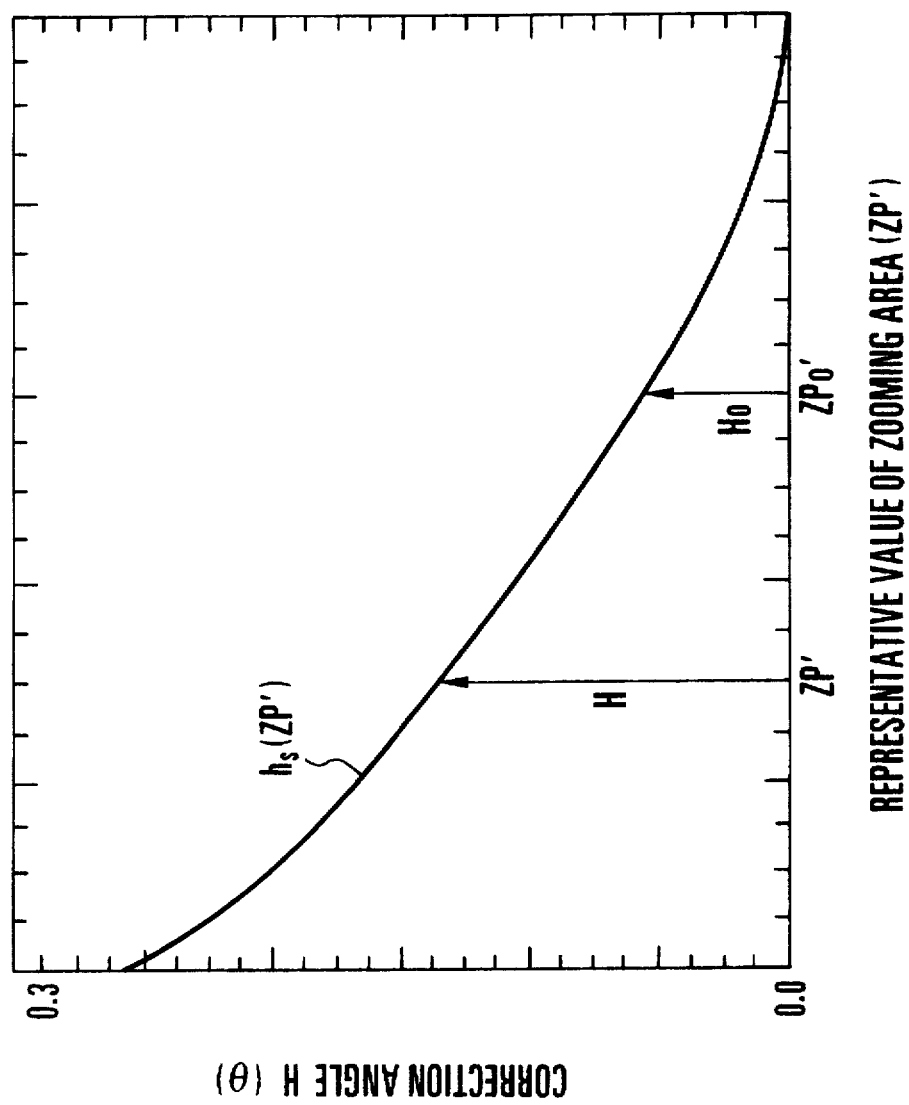
FIG. 10 shows by way of example the correction angle of the first embodiment of this invention.

At a step 509, the CPU 12 stores the representative value ZPo' as an initial value ZPtump'. At a step 510, the CPU 12 computes, using the coefficient Cn, a correction angle Ho obtained at a point of time when an in-focus state is obtained, as Ho=$h_s$ (ZPo') and stores the correction angle Ho. At a step 511, the zoom position information converting means 9 always reads the zoom position information ZP for the purpose of confirming whether or not any manual zooming operation is performed after the focusing action is performed at the step 502. At a step 512, the zoom position information ZP is converted into a representative value ZP' of an applicable zooming area. The result of conversion (data) is sent out to the CPU 12. At a step 513, the CPU 12 compares the representative value ZP' of the zooming area obtained from the zoom position information converting means 9 with the initial value ZPtump'. If these values are found to differ from each other and if a corrective driving is judged to be necessary during the process of zooming, the flow comes to a step 514. At the step 514, a new correction angle H is computed as H=$h_s$ (ZP'). FIG. 10 shows the relation of the correction angle to the representative value of the zooming area.

At a step 515, the number of driving control pulses P for the focusing lens driving means 7 which is a stepping motor is obtained from the following formula:

P=(H−Ho)/B (B: a conversion coefficient)

At a step 516, focus driving control information Pk is obtained from the following formula:

Pk=P−Po

At a step 517, the focus driving control information Pk is sent to the focusing lens driving means 7.

Next, at a step 518, the focusing lens driving means 7 is caused to drive the member 22 shown in FIG. 6 as much as a focusing angle corresponding to the focus driving control information Pk. As a result, the focusing lens 4b is moved along the optical axis.

At a step 519, the driving control pulse number P is stored and held as a new control pulse number Po. The representative value ZP' is stored and held as a new initial value ZPtump'. After that, the flow of operation comes back to the step 511 to read out again the zoom position information ZP. At the step 512, the zoom position information ZP is converted into the representative value ZP' of the applicable zooming area. The result of conversion (data) is sent out to the CPU 12.

At the step 513, the CPU 12 compares the representative value ZP' of the zooming area with the initial value ZPtump' newly stored by the step 519. Then, every time the two values differ from each other, driving for correcting the focus position is performed by repeating the actions of the steps 511 to 519.

Meanwhile, if the representative value ZP' is judged to be equal to the initial value ZPtump' at the step 513, the CPU 12 judges the zoom lens to be not in process of zooming or to be requiring no corrective driving. The flow then comes to a step 520. At the step 520, a check is made for the state of the switch SW1 which is a first stroke switch of the release button. If the switch SW1 is found to be in an off-state, the CPU 12 brings the flow of operation to an end.

If not, the flow comes back to the step 511 to repeat the actions of the steps 511 to 519.

The focus correcting procedures described above enable the embodiment to drive the focusing lens at an apposite focusing angle even while a zooming action is in process, so that a shift of focus taking place during the process of zooming can be lessened to adequately keep the zoom lens in an in-focus state.

Further, the embodiment is arranged such that a release can be made either by carrying out focusing or without carrying out focusing when the second stroke switch SW2 of the release button is turned on by the operator even while any of the actions described above is still in process.

Further, in the case of this embodiment, the amounts of correction for amounts of defocus to be computed by the second focus correcting means is obtained by using the correction angle as described in the foregoing. However, the use of the correction angle may be replaced with the use of the rotation angle (focusing angle) of the focusing rotary member of the first focus correcting means. The driving control pulses of the focusing lens driving means may be used in place of the correction angle. The same advantageous effect as the embodiment described is attainable by such modifications.

In case of the embodiment, any shift of focus that takes place during the process of zooming is corrected by dividing the object distance area into an object distance area for which only the first focusing correcting means is used and another object distance area for which the electronic correcting action is applied under the control of the CPU. However, this arrangement may be changed to apply the electronic correcting action to the whole object distance area. The amount of shift of focus can be further lessened over the whole range of object distance areas by such a change, so that an in-focus state can be more adequately retained.

This invention is not limited to the lens arrangement shown in FIG. 1 but of course applies likewise to other rear focus type zoom lenses differently arranged.

In accordance with this invention, as mentioned in the foregoing, the inclusion of the first focus correcting means which is composed of a cam mechanism is capable of lessening the amount of the shift of focus in relation to the driving error of focus driving means and also permits manual zooming within a main range of object distances, despite its relatively simple arrangement which is completed within the lens barrel. The invented arrangement enables the rear focus type zoom lens to be capable of adequately correcting the shift of focus due to zooming for all the focal lengths and over the whole range of object distances, without imposing any load on the power supply of the focus driving means and with only a small storage capacity, as the amounts of correction for amounts of defocus are arranged to be obtained by computation.

As described in the foregoing, particularly at the step 504, the information on the object distance area is computed by using the zoom position and the focusing lens position in combination. In the case of a second embodiment of this invention described below, this computing process is omitted and is replaced with the use of storage means, such as a ROM (read-only memory), which is arranged to store information on the object distances and the amounts of drawing out the focusing lens and to have the information read out on the basis of zoom positions.

Figure 11:
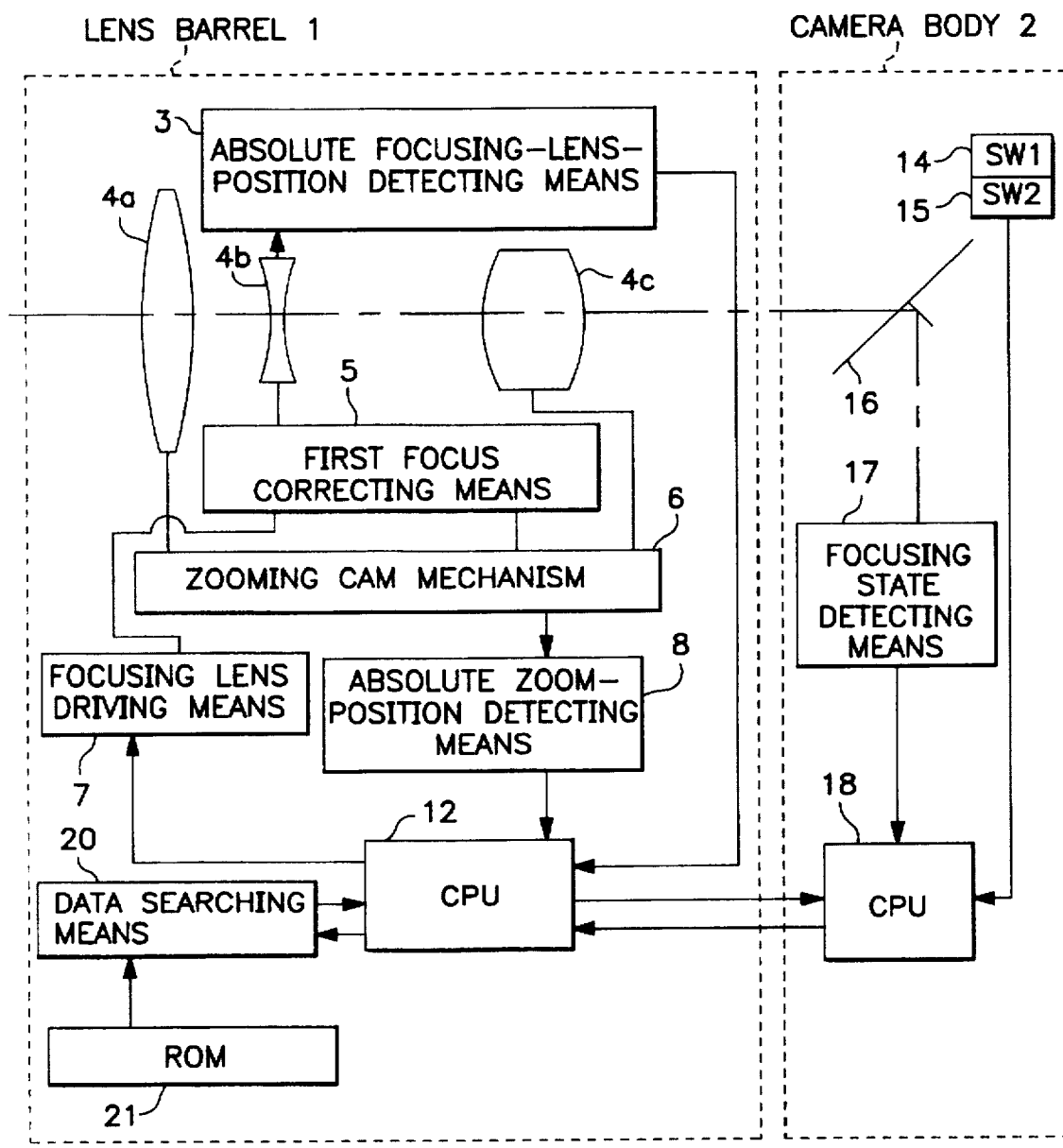
FIG. 11 is a block diagram showing the system arrangement of a second embodiment of this invention.

FIG. 11 shows in a block diagram the arrangement of the second embodiment of this invention. The arrangement shown is similar to FIG. 1 but differs from FIG. 1 in the following points: A ROM 21 is arranged to have storage contents which differ from those of the ROM 11 of FIG. 1, and there is provided data searching means 20 for making a search for data stored in the ROM 21.

Referring to FIG. 11, the ROM 21 stores data or information about the amounts of correction for amounts of defocus (defocus-correcting amounts). The information includes a matrix which consists of a plurality of divided zooming areas and a plurality of divided object distance areas. The information is expressed in the rotation angles of a focusing rotary member.

Figure 12:
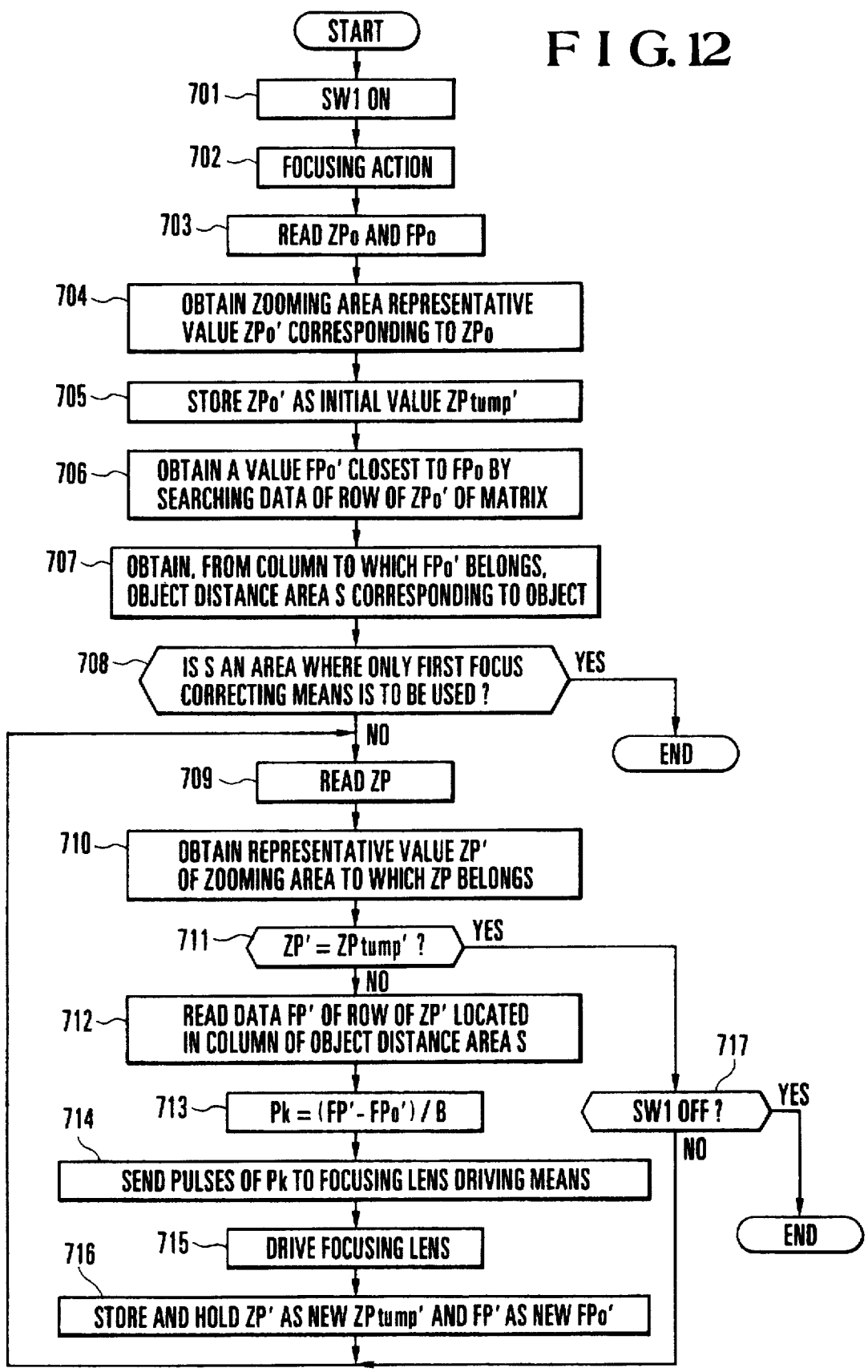
FIG. 12 is a flow chart showing the flow of control performed by the second embodiment.

The whole focus correcting operation of this (second) embodiment is described below with reference to a flow chart shown in FIG. 12:

At a step 701, the first stroke switch SW1 of a release button is turned on. At a step 702, a focusing action begins to be performed on the basis of the flow chart shown in FIG. 2. After completion of the focusing action, the flow comes to a step 703. At the step 703, the CPU 12 which is disposed within the lens barrel 1 reads focusing angle information FPo from the absolute focusing-lens-position detecting means 3 and zoom position information ZPo from the absolute zoom-position detecting means 8. The focusing angle information FPo is expressed in the rotation angle of the focusing rotary member.

With the zoom position divided into a plurality of areas, a table of correlation between zoom positions and zooming-area representative values showing each of the zooming areas by its representative value is stored within the ROM 21 which is arranged as storage means. At a step 704, the CPU 12 obtains, through the data searching means 20, a representative value ZPo' of a zooming area which corresponds to the zoom position information ZPo from the correlation table stored in the ROM 21. At a step 705, the representative value ZPo' obtained is set as an initial value ZPtump'.

At a step 706, a search is made for data included in the row of the representative value ZPo' on a matrix which relates to the defocus-correcting amounts and stored in the ROM 21. A value FPo' which is closest to the focusing angle information FPo is thus obtained. At a step 707, an object distance area S corresponding to the object of shooting is obtained by finding the position in the matrix of a column to which the value FPo' belongs.

At a step 708, a check is made to find whether the object distance area S is an area for which focus is to be corrected solely by the first focus correcting means as mentioned in the foregoing or an area for which focus is to be corrected by using the second focus correcting means which will be described later. If the object distance area S is found to be the area for which focus correction is to be made solely by the first focus correcting means, the CPU 12 brings its process to an end. If not, the flow comes to a step 709 for the operation of the second focus correcting means which is to be performed by the step 709 and steps subsequent to the step 709.

At the step 709, the CPU 12 again reads the zoom position information ZP, for the purpose of finding if a zooming operation is performed. At a step 710, the representative value ZP' of a zooming area to which the zoom position information ZP belongs is obtained by using the correlation table stored in the ROM 21. At a step 711, the representative value ZP' of the zooming area is compared with the initial value ZPtump'. If these values differ from each other and if a corrective driving is judged to be necessary during the process of zooming, the flow comes to a step 712. At the step 712, the value of data FP' in the row of the representative values ZP' of the zooming area located in the column of the object distance area S is read out from the matrix which relates to the defocus-correcting amounts. The flow then comes to a step 713.

At the step 713, the number of control pulses Pk of the focusing lens driving means 7 is obtained in accordance with the following formula:

Pk=(FP'−FPo')/B (B: a conversion coefficient)

At a step 714, the control pulses Pk are sent to the focusing lens driving means 7. At a step 715, the focusing lens 4b is driven according to the pulses Pk.

At a step 716, the representative value ZP' is stored and held as a new initial value ZPtump', and the value FP' is stored and held as a new value FPo'. The flow then comes back to the step 709. Again the value of the zoom position information ZP is read. The representative value ZP' of the zooming area to which the zoom position information ZP belongs is obtained from the correlation table stored within the ROM 21. The representative value ZP' is compared with the initial value ZPtump'. The steps 709 to 716 are repeated every time these two values are found by the comparison to differ from each other. The process of driving the focusing lens to correct its position is performed in this manner.

If, on the other hand, the representative value ZP' and the initial value ZPtump' are found to be equal to each other at the step 711, the CPU 12 judges the zoom lens to be not in process of zooming or to be requiring no corrective driving. The flow then comes to a step 717. At the step 717, a check is made for the state of the first stroke switch SW1 of the release button. If the switch SW1 is found to be in an off-state, the CPU 12 terminates its process. If not, the flow comes back to the step 709 to repeat the steps 709 to 716.

The focus correcting procedures described above enable the second embodiment to drive the focusing lens to an apposite focusing angle even while a zooming action is in process. Therefore, the shift of focus during the process of zooming can be suppressed to a small amount to maintain the zoom lens in an adequately in-focus state.

Further, when the second stroke switch SW2 of the release button is turned on by the operator while any of the actions described above is still in process, a release can be made either by carrying out a focusing action or without carrying out any focusing action.

While the second embodiment is arranged, as described above, to correct the shift of focus resulting from zooming by dividing the whole object distance range into one object distance range for which only the above-stated first focus correcting means is used and another object distance range for which the electronic correcting action is applied under the control of the CPU. However, this arrangement may be changed to apply the electronic correcting action to the whole object distance range. By this change, an in-focus state can be more adequately maintained by further reducing the amount of shift of focus over the whole object distance range.

Figure 13:
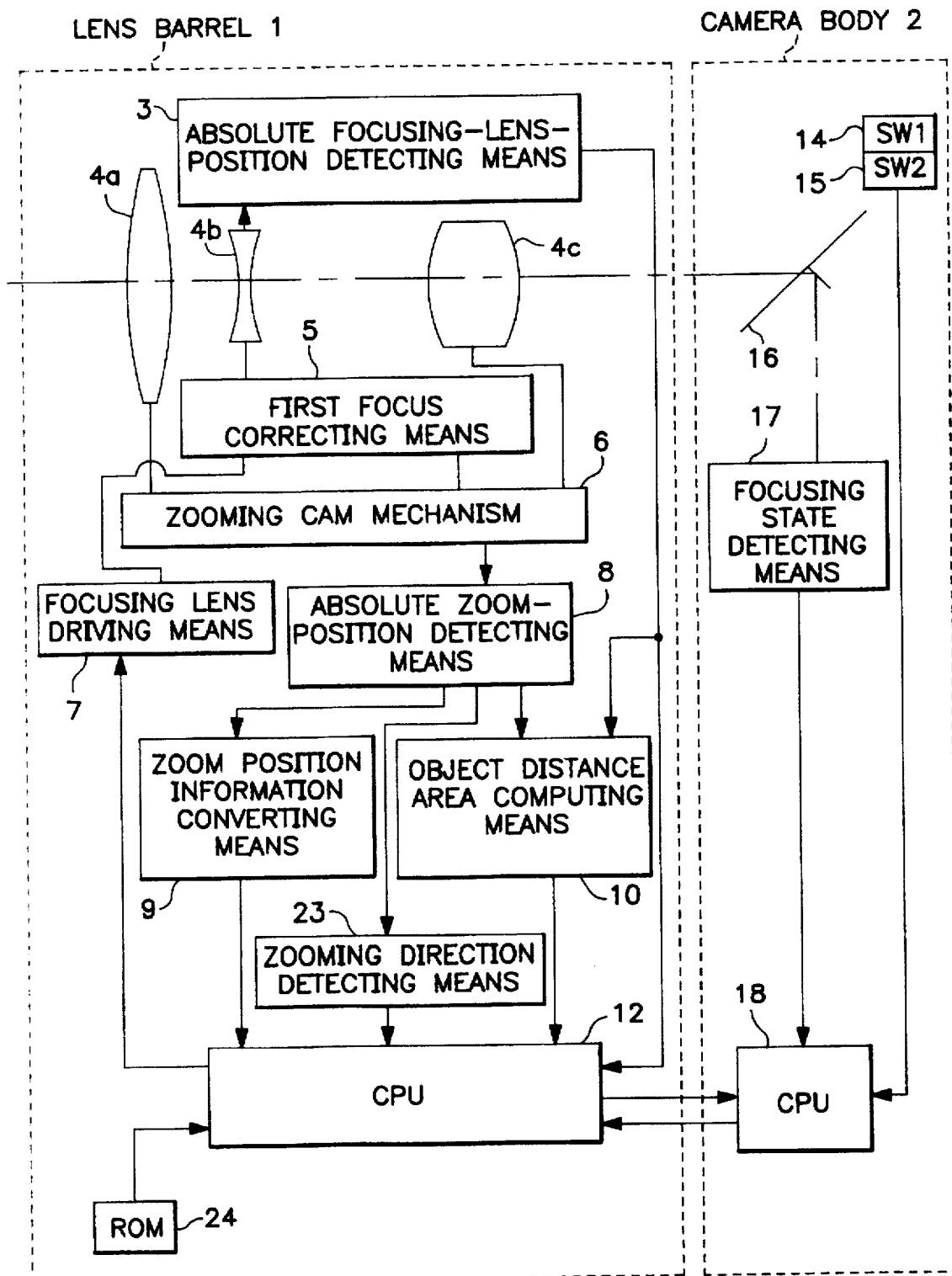
FIG. 13 is a block diagram showing the system arrangement of a third embodiment of this invention.

A third embodiment of this invention is next described. In the case of the third embodiment, instead of computing information on the correction angle shown in FIG. 10, i.e., the focusing drawing-out amount for the focusing, the number of pulses by which the stepping motor is to be driven according to each of object distances and each of zoom positions is stored in storage means such as a ROM or the like. FIG. 13 is a block diagram showing the arrangement of the third embodiment. In FIG. 13, all the parts that are the same as those of the first embodiment shown in FIG. 1 are indicated by the same reference numerals. The following description covers only some points where the third embodiment differs from the first embodiment.

Referring to FIG. 13, zooming direction detecting means 23 is arranged to detect the direction of zooming by using a signal obtained from the absolute zoom-position detecting means 8 and to send the result of detection to the CPU 12. A ROM (storage element) 24 which is employed as storage means stores information on defocus-correcting amounts. The information is in the form of a matrix which consists of data of a plurality of divided zooming areas and a plurality of divided object distance areas. These data are stored in the form of the numbers of control pulses to be applied to the focusing lens driving means 7. The CPU 12 is disposed within the lens barrel 1.

Figure 14:
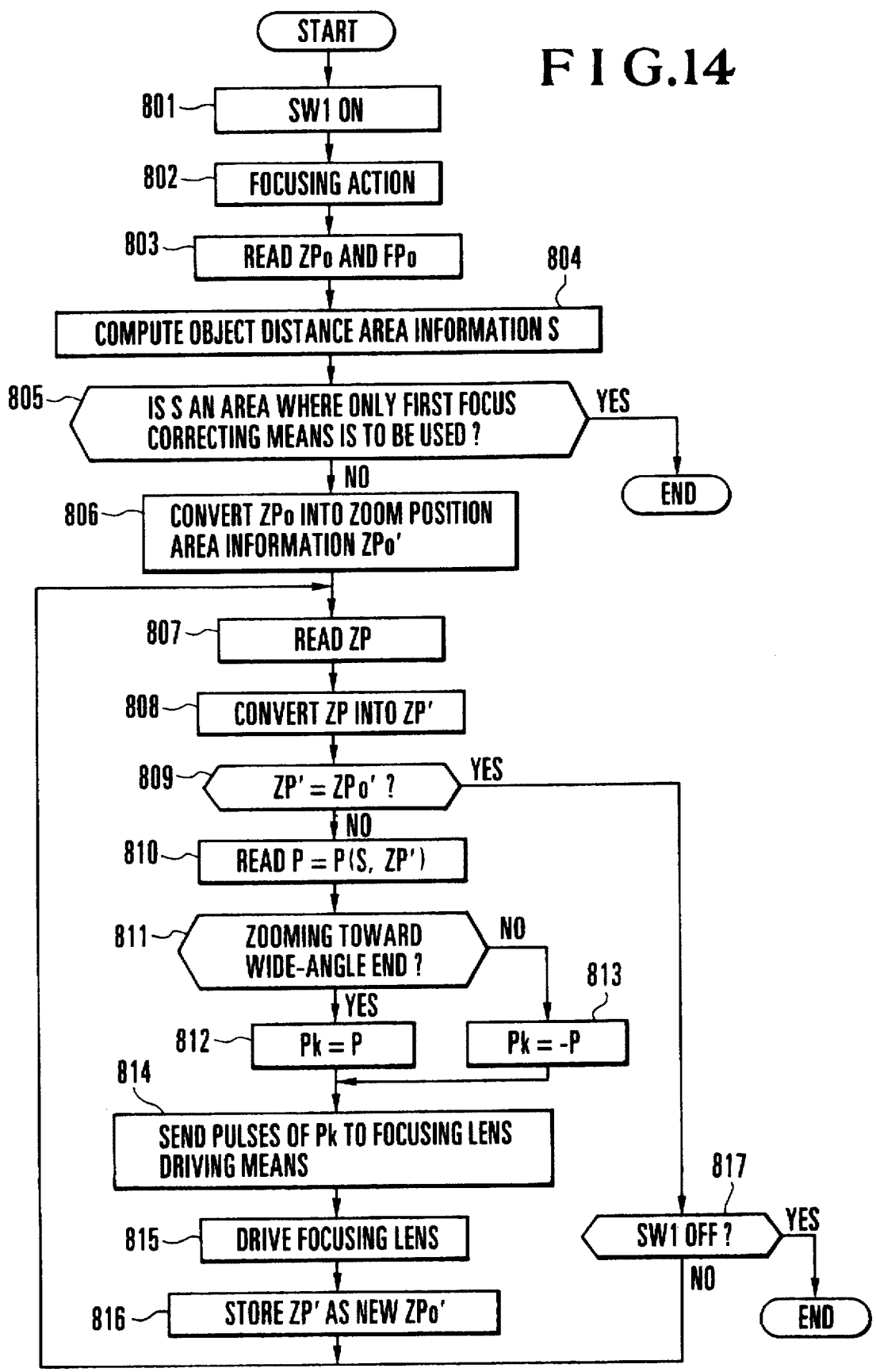
FIG. 14 is a flow chart showing the flow of control performed by the third embodiment.

The third embodiment performs the whole focus correcting operation as described below with reference to a flow chart shown in FIG. 14.

At a step 801, when the first stroke switch SW1 of the release button is turned on, the flow of operation comes to a step 802. At the step 802, a focusing action is executed on the basis of the procedures shown in the flow chart of FIG. 2. After completion of the focusing action, the flow comes to a step 803. At the step 803, the object distance area computing means 10 disposed in the lens barrel 1 reads focusing lens position information FPo from the absolute focusing-lens-position detecting means 3 and zoom position information ZPo from the absolute zoom-position detecting means 8.

The focusing lens position information FPo and the zoom position information ZPo are direct positional information indicating the rotation angle of the focusing rotary member, like the focusing angle mentioned in the foregoing, or the direction in which the focusing lens moves, like the position of the focusing lens in the direction of the optical axis.

The range of shooting distances from an infinite object distance to a minimum object distance is divided into a plurality of object distance areas beforehand. At a step 804, the object distance area computing means 10 computes object distance area information S to which the object of shooting corresponds, by using the focusing lens position information FPo and the zoom position information ZPo. The data of computation is sent to the CPU 12.

At a step 805, a check is made to find whether the object distance area information S indicates an area for which only the first focus correcting means is to be used for focus correction or another area for which the second focus correcting means is to be used for focus correction. If the object distance area information S is found to indicate the area for which only the first focus correcting means is to be used, the CPU 12 brings its process to an end. If not, the flow of operation comes to a step 806 to execute the action of the second focus correcting means at the step 806 and steps subsequent to the step 806.

At the step 806, the zoom position information converting means 9 converts the zoom position information ZPo into a representative value ZPo' representing one of a plurality of zooming areas which have been divided beforehand. The data obtained by the conversion is sent to the CPU 12.

At a step 807, the zoom position information converting means 9 continuously reads the zoom position information ZP. At a step 808, the zoom position information ZP is converted into a representative value ZP' of the current zooming area. The data obtained by the conversion is sent to the CPU 12. At a step 809, the CUP 12 compares the representative value ZP' of the current zooming area with the representative value ZPo' of the zooming area previously obtained by the step 806. If these values are found to differ from each other and if the corrective driving is decided to be necessary as zooming is in process, the flow comes to a step 810. At the step 810, the value of data P=(S, ZP') of the row of the representative value ZP' of the zooming area in the column of the object distance area S is read from the matrix of defocus-correcting amounts.

At a step 811, the zooming direction detecting means 23 detects the direction of zooming. If the zooming is found to be in the direction of the wide-angle end, the flow comes to a step 812 to set the number of control pulses Pk for the focusing lens driving means 7 as Pk=P. If not, the flow comes to a step 813 to set the number of control pulses Pk as Pk=-P. At a step 814, the control pulses Pk are sent to the focusing lens driving means 7 to cause the focusing lens 4b to be driven accordingly at a step 815.

At a step 816, the representative value ZP' which is obtained at the step 808 is stored and held as a new representative value ZPo'. The flow then comes back to the step 807. Again the value of the zoom position information ZP is read out at the step 807. At the step 808, the zoom position information ZP is converted into the representative value ZP' of the applicable zooming area, and the data obtained by the conversion is sent to the CPU 12. At the step 809, the CPU 12 compares the representative value ZP' with the representative value ZPo' newly stored at the step 816. Every time these two values are found to differ from each other, the actions of the steps 807 to 816 are repeated to carry out driving for correcting the position of the focusing lens.

Meanwhile, if the representative value ZP' and the new representative value ZPo' are found to be equal to each other at the step 809, the CPU 12 judges the zoom lens to be not in process of zooming or to be requiring no corrective driving. The flow of operation then comes to a step 817. At the step 817, a check is made for the state of the first stroke switch SW1 of the release button. If the switch SW1 is found to be in an off-state, the CPU 12 terminates the flow of operation. If not, the flow comes back to the step 807 to repeat the steps 807 to 816.

With the third embodiment arranged to carry out focus correction according to the procedures described above, the focusing lens can be driven and moved to its position of an apposite focusing angle even during the process of zooming. Therefore, the shift of focus taking place during the process of zooming is suppressed to a small amount, so that the zoom lens can be adequately maintained at an in-focus state.

Further, if the second stroke switch of the release button is turned on by the operator while any of the above-stated action is in process, a release is made either by carrying out a focusing action or not carrying out any focusing action.

As mentioned in the foregoing, this embodiment is arranged to correct the shift of focus taking place during the process of zooming by dividing the whole range of object distances into an object distance range for which only the first focus correcting means is to be used and another object distance range to which an electronic correcting action is to be applied under the control of the CPU. However, this arrangement may be changed to apply the electronic correcting action to the whole range of object distances. By such a change, the amount of shift of focus can be further lessened over the whole range of object distances, so that an in-focus state can be more adequately retained.

Further, like the second embodiment described in the foregoing, the invented arrangement of the third embodiment is of course applicable not only to the rear focus type zoom lens of the lens arrangement shown in FIG. 1 but also to other rear focus type zoom lenses of different lens arrangements.

In accordance with this invention, as mentioned in the foregoing, the inclusion of the first focus correcting means which is composed of a cam mechanism permits reduction in amount of the shift of focus in relation to the driving error of focus driving means and also permits manual zooming within a main range of object distances, despite its relatively simple arrangement which is completed within the lens barrel. The invented arrangement does not impose any unnecessary load on the power supply as the focus driving means is not constantly driven. Since the data about the number of corrective driving control pulses are directly stored in the matrix of the storage means, the required storage capacity of the storage means can be reduced. Further, the invented arrangement enables the rear focus type zoom lens to be capable of adequately correcting the shift of focus due to zooming for all the focal lengths and over the whole range of object distances, without compelling the CPU to perform any complex and highly elaborate computing operations.

What is claimed is:

1. A device comprising:

a zoom lens for zooming to change a focal length, wherein an amount of driving of a focusing lens is changed in accordance with zooming of said zoom lens;

zoom position detecting means for detecting a zoom position of said zoom lens;

focusing lens position detecting means for detecting a position of the focusing lens;

a cam tube having a cam groove along which the focusing lens slides in accordance with a zooming operation, wherein said cam tube rotates around an optical axis and moves in an optical axis direction with the zooming operation;

memory means for storing information relative to a remaining amount of movement of the focusing lens in accordance with the zooming operation;

calculating means for calculating a focus correction amount necessitated by the zooming operation in accordance with the zoom position, the position of the focusing lens, and the information stored in said memory means; and drive means for driving the focusing lens in accordance with the focus correction amount, wherein said drive means drives the focusing lens to slide along the cam groove and the focusing lens is moved in the optical axis direction.

2. A device according to claim 1, wherein said drive means is a motor, and wherein said focusing lens is arranged to be moved by a driving force of said motor.

3. A device according to claim 1, wherein said drive means moves only the focusing lens along the cam groove with said cam tube being fixed.

4. A device according to claim 1, wherein said calculating means calculates the focus correction amount without using a focus detection signal.

* * * * *

UNITED STATES PATENT AND TRADEMARK OFFICE
CERTIFICATE OF CORRECTION

PATENT NO.    :  5,790,902

DATED         :  August 4, 1998

INVENTOR(S)   :  Satoru MIZOUCHI, et al.

It is certified that error appears in the above-identified patent and that said Letters Patent is hereby corrected as shown below:

COLUMN 2:

Line 18, "zooming an" should read --zooming on an--.

COLUMN 3:

Line 6, "automatic" should read --by automatic--.
   Line 13, "problems" should read --problem--.

COLUMN 5:

Line 59, "folow" should read --flow--.

COLUMN 7:

Line 25, "within" should read --within an--.

COLUMN 8:

Line 25, "of" should read --of the--.

UNITED STATES PATENT AND TRADEMARK OFFICE
CERTIFICATE OF CORRECTION

PATENT NO.    : 5,790,902

DATED         : August 4, 1998

INVENTOR(S)   : Satoru MIZOUCHI, et al.

It is certified that error appears in the above-identified patent and that said Letters Patent is hereby corrected as shown below:

<u>COLUMN 9</u>:

Line 39, "compute" should read --computes--.

Signed and Sealed this

Twenty-fifth Day of May, 1999

Attest:

Q. TODD DICKINSON

*Attesting Officer*   *Acting Commissioner of Patents and Trademarks*